United States Patent
Agrawal et al.

(10) Patent No.: US 12,261,911 B2
(45) Date of Patent: Mar. 25, 2025

(54) ACCESSING VEHICLES BY EDGE COLLABORATION

(71) Applicant: INTERNATIONAL BUSINESS MACHINES CORPORATION, Armonk, NY (US)

(72) Inventors: Tushar Agrawal, West Fargo, ND (US); Jeremy R. Fox, Georgetown, TX (US); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/930,730

(22) Filed: Sep. 9, 2022

(65) Prior Publication Data
US 2024/0089321 A1    Mar. 14, 2024

(51) Int. Cl.
*H04L 67/12*    (2022.01)
*H04L 67/104*    (2022.01)

(52) U.S. Cl.
CPC ............ *H04L 67/12* (2013.01); *H04L 67/104* (2013.01)

(58) Field of Classification Search
CPC ....... H04L 67/12; H04L 67/104; H04L 45/42; H04L 45/70; H04L 45/38; H04L 67/101; H04L 12/5692; H04L 45/123; H04W 4/46; H04W 48/16; H04W 76/10; H04W 84/12; H04W 8/005; H04W 48/18
See application file for complete search history.

(56) References Cited

U.S. PATENT DOCUMENTS

| | | | | |
|---|---|---|---|---|
| 7,966,491 B2* | 6/2011 | Nassor | ................ | H04L 67/1063 |
| | | | | 713/153 |
| 9,591,676 B1* | 3/2017 | Lopes | .................. | H04W 76/15 |
| 2003/0203741 A1* | 10/2003 | Matsuo | ................ | H04W 48/18 |
| | | | | 455/518 |
| 2005/0090275 A1* | 4/2005 | Wang | .................... | H04W 48/18 |
| | | | | 455/512 |

(Continued)

FOREIGN PATENT DOCUMENTS

KR        20140003044 A       1/2014

OTHER PUBLICATIONS

Author Unknown, "The best connection to your Mercedes," Mercedes-Benz, Accessed: Jun. 8, 2022, https://www.mercedes-benz.co.in/passengercars/mercedes-benz-cars/mercedes-me/stage-mercedes-me.module.html, 8 pages.

(Continued)

*Primary Examiner* — Schquita D Goodwin
*Assistant Examiner* — Linh T. Nguyen
(74) *Attorney, Agent, or Firm* — Anthony M. Pallone (57) ABSTRACT

According to one embodiment, a method, computer system, and computer program product for establishing access to vehicles is provided. The embodiment may include identifying at least two devices, including a requesting device and a target device. The embodiment may also include identifying one or more networks, including at least one alternative network. The embodiment may further include evaluating each network from the one or more networks to determine a best network. The embodiment may also include establishing access from the requesting device to the target device over the determined best network.

14 Claims, 5 Drawing Sheets

(56) References Cited

U.S. PATENT DOCUMENTS

| | | | | |
|---|---|---|---|---|
| 2007/0019670 A1* | 1/2007 | Falardeau | ............ | H04W 48/18 |
| | | | | 370/465 |
| 2008/0155338 A1* | 6/2008 | Rusmanov | ......... | G06F 11/3696 |
| | | | | 714/38.13 |
| 2009/0252134 A1* | 10/2009 | Schlicht | ............... | H04L 1/0015 |
| | | | | 709/205 |
| 2010/0040016 A1* | 2/2010 | Lor | .................... | H04W 12/062 |
| | | | | 370/331 |
| 2014/0005859 A1* | 1/2014 | Baskin | ............. | G07C 9/00309 |
| | | | | 701/2 |
| 2014/0033288 A1* | 1/2014 | Wynn | .................. | H04W 48/18 |
| | | | | 726/7 |
| 2015/0029954 A1* | 1/2015 | Victor | ................ | H04L 12/5692 |
| | | | | 370/329 |
| 2015/0036515 A1* | 2/2015 | Fayssal | ................ | H04L 43/028 |
| | | | | 370/252 |
| 2015/0036539 A1* | 2/2015 | Townend | ............. | H04W 84/18 |
| | | | | 370/254 |
| 2015/0127733 A1* | 5/2015 | Ding | ........ | H04W 4/70 |
| | | | | 709/204 |
| 2015/0163715 A1* | 6/2015 | Das | ....................... | H04W 36/14 |
| | | | | 455/436 |
| 2015/0189569 A1* | 7/2015 | Visuri | .................. | H04M 15/49 |
| | | | | 370/331 |
| 2015/0215832 A1* | 7/2015 | Fitzpatrick | ............ | H04W 48/14 |
| | | | | 455/426.1 |
| 2015/0339921 A1* | 11/2015 | Hainzlmaier | ........ | G08G 1/0141 |
| | | | | 340/905 |
| 2016/0269927 A1* | 9/2016 | Kim | ...................... | H04W 24/08 |
| 2016/0295589 A1* | 10/2016 | Nikopour | ............. | H04W 4/023 |
| 2016/0335743 A1* | 11/2016 | Konstantinov | ..... | G06F 3/04845 |
| 2017/0116804 A1* | 4/2017 | Bae | ........................ | G07C 9/25 |
| 2017/0129425 A1 | 5/2017 | Dalke | | |
| 2017/0324733 A1* | 11/2017 | Howry | ................. | H04W 12/50 |
| 2018/0018869 A1 | 1/2018 | Ahmad | | |
| 2018/0181117 A1 | 6/2018 | Rosenberg | | |
| 2018/0220309 A1* | 8/2018 | Gomes | ................ | G05D 1/0022 |
| 2019/0356552 A1* | 11/2019 | Ricci | ...................... | G06F 3/0486 |
| 2020/0107254 A1* | 4/2020 | Cuevas Ramirez | .. | H04W 88/06 |
| 2020/0228950 A1* | 7/2020 | Clark | ....................... | H04L 67/06 |
| 2020/0229174 A1* | 7/2020 | Nguyen | ................ | H04W 64/00 |
| 2020/0357269 A1 | 11/2020 | Elhadeedy | | |
| 2022/0007438 A1* | 1/2022 | Agrawal | ............. | H04B 17/318 |
| 2023/0093883 A1* | 3/2023 | Robertson | ............... | H04L 69/18 |
| | | | | 370/229 |
| 2023/0110969 A1* | 4/2023 | Luvö | ....................... | H04W 4/70 |
| | | | | 705/39 |
| 2023/0112190 A1* | 4/2023 | Saraf | ................... | H04L 67/1008 |
| | | | | 709/223 |
| 2023/0422085 A1* | 12/2023 | Babbellapati | ..... | H04W 28/0268 |

OTHER PUBLICATIONS

Corkery et al., "Miss a Payment? Good Luck Moving That Car," The New York Times, Sep. 24, 2014, https://dealbook.nytimes.com/2014/09/24/miss-a-payment-good-luck-moving-that-car, 8 pages.

IBM, "IBM IoT Connected Vehicle Insights—Public," IBM.com, Accessed: Jun. 8, 2022, https://www.ibm.com/docs/en/icvi/base, 4 pages.

IBM, "IBM IoT Connected Vehicle Insights," IBM.com, Accessed: Jun. 8, 2022, https://www.ibm.com/products/iot-for-automotive, 6 pages.

McLellan, "What is V2X communication? Creating connectivity for the autonomous car era," ZD Net, Nov. 4, 2019, https://www.zdnet.com/home-and-office/networking/what-is-v2x-communication-creating-connectivity-for-the-autonomous-car-era/, 20 pages.

Ryu et al., "Context-Awareness based Driving Assistance System for Autonomous Vehicles*," International Journal of Control and Automation, vol. 11, No. 1 (2018), Accepted: Jan. 20, 2018, http/dx.doi.org/10.14257/jca.2018.11.1.14, pp. 153-162.

Vleugels, "Police can remotely drive your stolen Tesla into custody," The Next Web, Nov. 19, 2018, https://thenextweb.com/news/police-control-your-self-driving-cars, 7 pages.

* cited by examiner

ACCESSING VEHICLES BY EDGE COLLABORATION

BACKGROUND

The present invention relates generally to the field of computing, and more particularly to Internet of Things (IoT).

IoT is a field of computing that utilizes internet-connected versions of everyday objects to bring advanced computing features to everyday life. These objects may have processors, sensors, and connectivity features such as wired or wireless networking features. Modern vehicles, for example, are IoT devices. Vehicles are often connected to the internet, have external and internal sensors, and are capable of communicating useful information to and from other devices. IoT features enable users to access, check, and often control IoT devices from their personal computing devices, such as phones and laptops, but also from other connected devices such as thermostats, watches, and car keys.

SUMMARY

According to one embodiment, a method, computer system, and computer program product for establishing access to vehicles is provided. The embodiment may include identifying at least two devices, including a requesting device and a target device. The embodiment may also include identifying one or more networks, including at least one alternative network. The embodiment may further include evaluating each network from the one or more networks to determine a best network. The embodiment may also include establishing access from the requesting device to the target device over the determined best network.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to IoT. The following described exemplary embodiments provide a system, method, and program product to, among other things, establish access to a vehicle. Therefore, the present embodiment has the capacity to improve the technical field of IoT by providing a process to securely establish access when connectivity to access servers is limited or unavailable.

As previously described, IoT is a field of computing that utilizes internet-connected versions of everyday objects to bring advanced computing features to everyday life. These objects may have processors, sensors, and connectivity features such as wired or wireless networking features. IoT devices may interact over internet connections or more local connections.

Users may wish to securely access their devices under a variety of network conditions. For example, a vehicle owner may want to start the vehicle remotely from a cell phone. Traditionally, the system may need to establish a secure connection from a cell phone to the vehicle by use of an internet server or edge computing server to which the vehicle and cell phone both have a direct connection. However, IoT devices may not always have a direct connection to such servers available, and users may still need to access their devices in spite of these connection issues. As such, it may be advantageous to establish access to vehicles or other IoT devices through collaboration with other IoT devices.

According to at least one embodiment, an IoT solution may identify one or more vehicles, including at least a user's vehicle to be accessed from a client device. The system may then identify one or more networks for accessing the vehicles, including at least one network that does not rely on a direct connection between the user's vehicle and the client device, and evaluate each of these networks for speed, security, and similar concerns. The best network available may be used to establish access between the client device and the user's vehicle.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
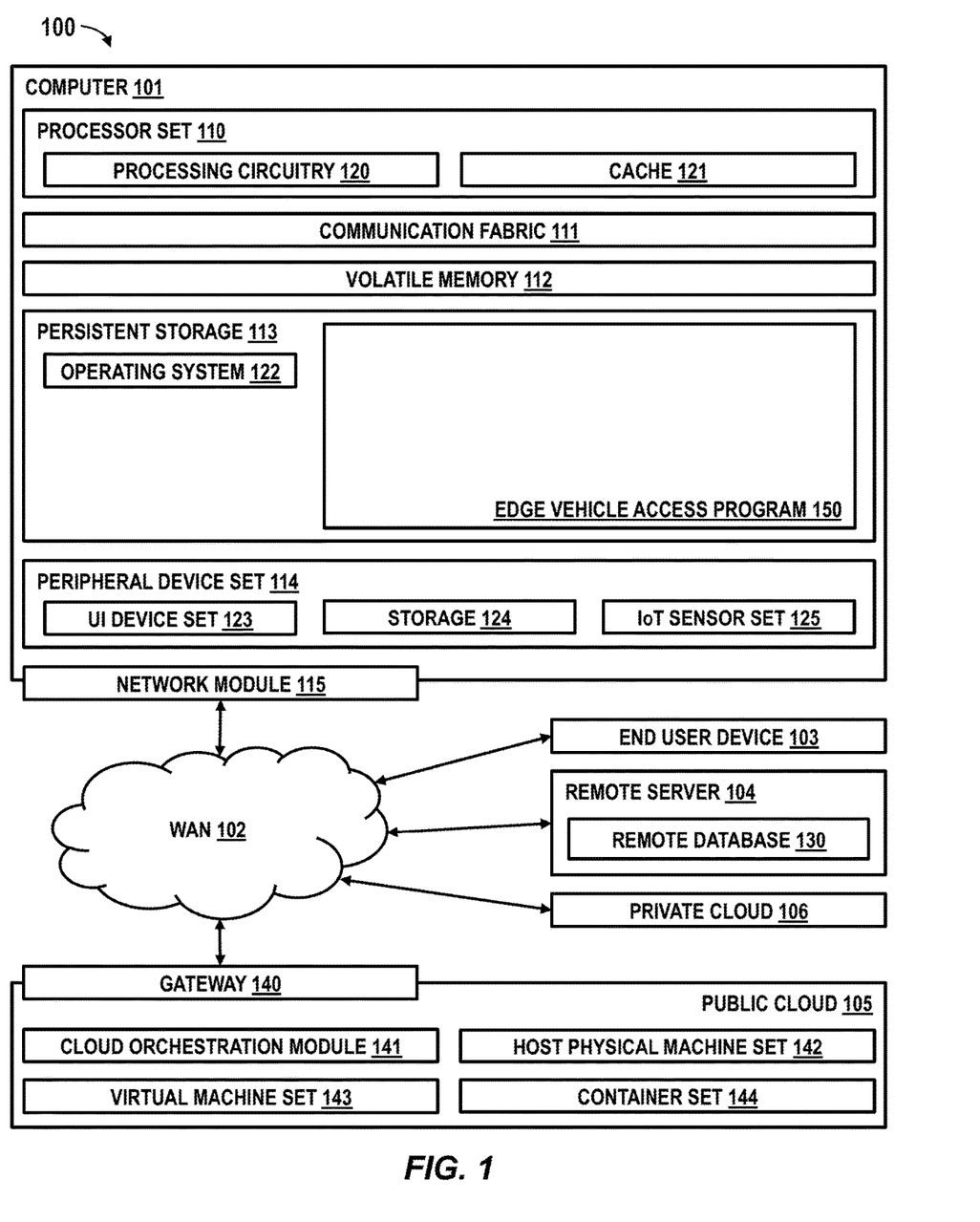
FIG. 1 illustrates an exemplary networked computing environment according to at least one embodiment.

Computing environment 100 contains an example of an environment for the execution of at least some of the computer code involved in performing the inventive methods, such as edge vehicle access program 150. In addition to edge vehicle access program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and edge vehicle access program 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in edge vehicle access program 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in edge vehicle access program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth® (Bluetooth and all Bluetooth-based trademarks and logos are trademarks or registered trademarks of the Bluetooth Special Interest Group and/or its affiliates) connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi® signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi® network. The WAN 102 and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Edge vehicle access program 150 may be a set of computer instructions that carry out the inventive steps. Upon identifying two or more devices, the edge vehicle access program 150 may identify one or more networks for use in edge vehicle access. The edge vehicle access program 150 may then evaluate each network, and select the best one for establishing access from a requesting device to a target device. Notwithstanding depiction in computer 101, edge vehicle access program 150 may be stored in and/or executed by, individually or in any combination, end user device 103, remote server 104, public cloud 105, and private cloud 106. The method for establishing access to vehicles is explained in further detail below with respect to FIG. 2.

Figure 2:
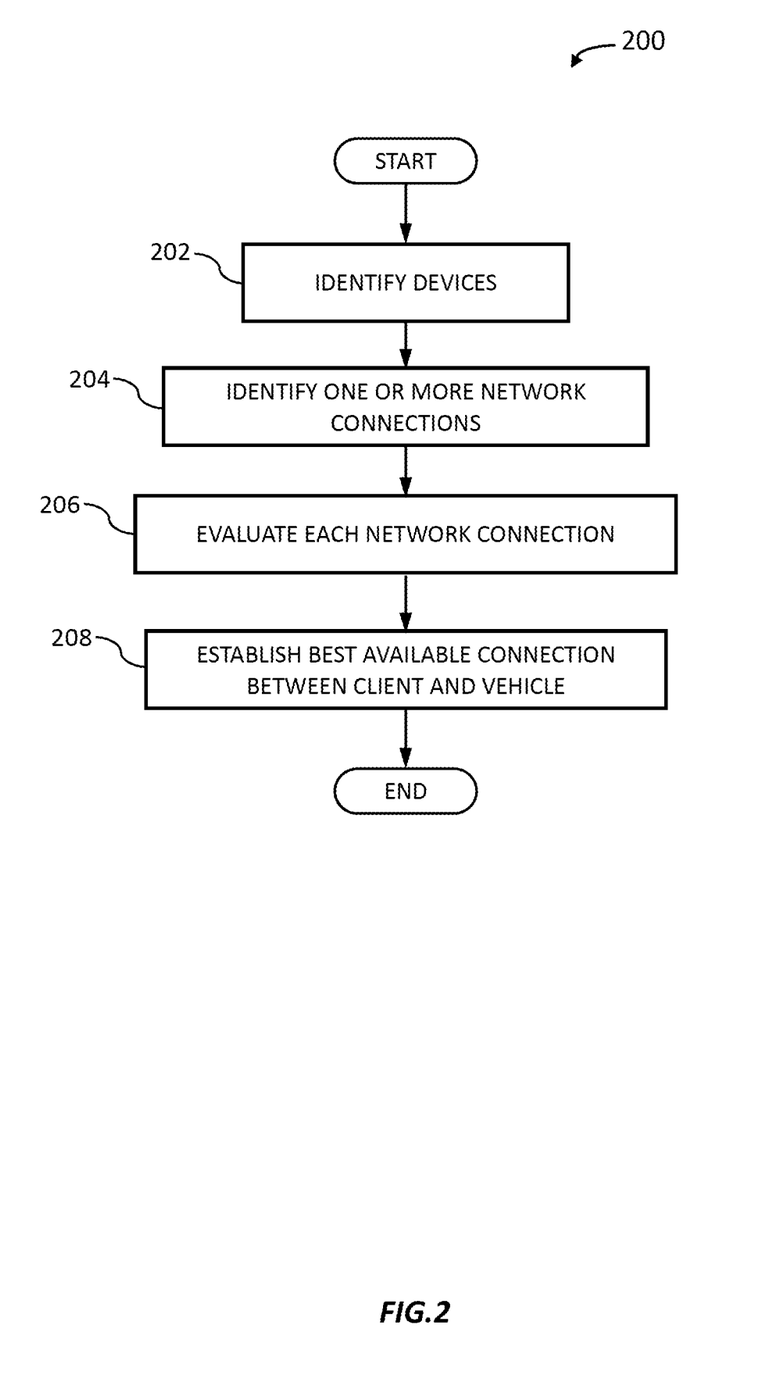
FIG. 2 illustrates an operational flowchart for a process for establishing access to vehicles according to at least one embodiment.

Referring now to FIG. 2, an operational flowchart illustrating a process for establishing access to vehicles 200 is depicted according to at least one embodiment. At 202, the edge vehicle access program 150 identifies two or more devices, including a target device and a requesting device. A target device may include, for example, a vehicle, a smart thermostat, a television, or any other computing device that a user, device, or service may request access to. The requesting device may include a cell phone, a car key, a server, a laptop, or any other computing device.

In at least one embodiment, the edge vehicle access program 150 may identify additional devices that may constitute a network identified at 204. For example, additional devices may include one or more access servers, one or more vehicles, and other IoT devices. An access server may, for example, be a cloud server, edge server, or virtual server, and may serve to securely moderate access to the target device, or process access requests from the requesting device.

Additional devices may choose to participate in edge vehicle access by an opt-in procedure. For example, an opt-in procedure may display in a vehicle's user interface, and the edge vehicle access program 150 may only identify vehicles that have opted in. Alternatively, the edge vehicle access program 150 may establish a network at 204 from only devices that have opted in.

In at least one embodiment, identifying devices may include collecting data from those devices by an opt-in procedure. For example, the edge vehicle access program 150 may collect a battery level of a target device. Alternatively, the edge vehicle access program 150 may collect information on the networking capabilities of a device.

In another embodiment, the edge vehicle access program 150 may further identify a request from the requesting device. A request may, for example, be a request to the target vehicle, to another device, or to a server. A request may utilize an internet connection, a Bluetooth® connection, a local area network connection, a wired connection, an edge network connection, or any network identified at 204. A request may be in the form of a hypertext transfer protocol (HTTP) request, a client uniform resource locator (cURL) request, a SOAP request, a representational state transfer (REST) request, or a request with any other public or private API or protocol. For example, a mobile phone application may issue a REST API call directly to a vehicle requesting access to control that vehicle remotely.

In a further embodiment, a request may generally request access to the target device. Alternatively, a request may include a specific request to perform a certain task, such as unlocking a vehicle, starting a vehicle remotely, or checking a vehicle's battery level.

In an alternate embodiment, a requesting device may request access to more than one target device at once. For example, a car rental service's web server or desktop computer may request data about the maintenance of or the gas tank levels of all vehicles in the service's fleet at once, or of all vehicles returned in the past 24 hours.

In at least one embodiment, the edge vehicle access program 150 may identify new devices at any point after initially identifying devices. The edge vehicle access program 150 may also collect additional data from devices that opt into such data collection over time.

Then, at 204, the edge vehicle access program 150 identifies one or more networks, including at least one alternative network, in which the target device participates. In at least one embodiment, networks may include the Internet, a local area network, an edge computing network, a Wi-Fi network, a mobile wireless network, a network of devices connected by Bluetooth® connections, a network connected by multiple network technologies, or an ad-hoc network projected from a device. An alternative network may include a secondary network or a peer-to-peer network. A secondary network may be any network containing an access server where the target device is not connected directly to an access server. A peer-to-peer network may be any network that does not contain an access server.

In at least one embodiment, a network may include a direct network, wherein a target device and an access server are connected directly by a direct, secure connection. Alternatively, a network may include a secondary network where a device is connected to one or more additional devices, and one or more additional devices are connected to an access server. Connections in a secondary network may, for example, send data securely from one device to another, so that devices without their own internet connection can nevertheless reach a web server. Sending and receiving data may use known secure methods, such as encryption or tokenization, so that individual devices in the network cannot establish access without valid permission.

Alternatively, a network may be a peer-to-peer network. For example, if devices are vehicles, a peer-to-peer network may be a vehicle-to-vehicle network, where each vehicle communicates with other vehicles in range, but where the network does not connect to a dedicated access server.

In at least one embodiment, the edge vehicle access program 150 may identify more than one of the same type of network. For example, the edge vehicle access program 150 may identify two peer-to-peer networks using incompatible network technologies. Alternatively, the edge vehicle access program 150 may identify three different secondary networks to connect to three different access servers. The edge vehicle access program may connect, for example to one direct network, four secondary networks, and two peer-to-peer networks.

In at least one embodiment, the edge vehicle access program 150 may identify new networks at any point after initially identifying networks. Identifying new networks may be performed in response to identifying new devices, in response to evaluating or reevaluating existing networks, or regularly or continuously to ensure optimal performance or security.

Then, at 206, the edge vehicle access program 150 evaluates each network. Evaluating a network may include, for example, measuring signal strength between nodes, assessing security of nodes, assessing overall speed of a network, or assessing overall security of a network. Alternatively, evaluating may include counting a number of nodes on which a network must rely in order to establish access from the requesting device to the target device. Evaluating a network may further include determining an overall quality rating for a network.

In at least one embodiment, evaluating may include measuring a signal strength between nodes, an effective range of a network, a level of redundancy, or other factors that may affect a network's resilience or the ability of a network to perform consistently. For example, evaluating may include a measure of the size of a network if the most important node were to leave the network. Alternatively, evaluating may include any other measure of a network under a similar negative condition as a measure of resilience.

In an alternate embodiment, evaluating may include determinations regarding the overall speed of a network. Evaluating speed may include measuring the processing speed or connection speed of each device, the download or upload speeds from a target device to the network, ping from one device to another, maximum ping from one device to the farthest device, or resilience as discussed above. Speed may be measured at a particular time, as an average over a given range of times, or by measuring technical specifications of a device, such as the stated speed of a processor, the amount of ram available to a device, or the version of the Bluetooth® standard the device is able to support.

Evaluating speed may further include determining the number of devices that a network requires to establish access, or the number of connections or "hops" between devices. For example, if, on a secondary network, device A is connected to device B, which is connected to device C, which is connected to an access server, three hops would be required to establish access to device A. Alternatively, a peer-to-peer network may rely on a security technique that requires consensus among five or more devices.

In another embodiment, evaluating may include determinations regarding the security of a network. Evaluating security may include determining the number of devices that a network requires to establish access, or the number of connections or "hops" between devices. Alternatively, evaluating security may include determining a number of devices necessary to pose a security risk. For example, if a peer-to-peer network relies on a security technique that requires consensus among five or more devices, three bad actors may pose a security risk, whereas two bad actors may not. In such an example, a higher number of bad actors necessary to pose a security risk may correspond to higher security, and a lower number may correspond to increased risk. Security may be measured as an overall numerical rating. Alternatively, security may be measured as a binary measure of whether a network is secure or not. The edge vehicle access program 150 may, for example, determine a threshold value of any security factor to determine whether or not a network is secure.

In yet another embodiment, evaluating may include a combination of more than one of the above factors. A combination may include a sum or product of various factors listed above, a complex function based on one or more of the above factors, or a simpler measurement that functions as a proxy or more than one of the above factors, such as the number of devices that a network requires to establish access.

In at least one embodiment, evaluating may be performed by a process of artificial intelligence. Artificial intelligence may involve use of machine learning, neural networks, or other known artificial techniques to determine the optimal network. Evaluating may also be performed, for example, as an approximate process that prioritizes speed or other concerns over an accurate evaluation.

In another embodiment, evaluating may include ranking networks. Networks may be ranked according to one or more ranking criteria. In at least one embodiment, ranking criteria may include evaluation criteria. For example, if security is measured as a binary measure, secure networks may be ranked above non-secure networks. Ranking criteria may further include a network type. For example, a direct network may rank above a secondary network, and a secondary network may rank above a peer-to-peer network. Ranking criteria may further include a network technology. For example, a network that utilizes secured WiFi connections may rank above a network that utilizes mobile network connections.

In further embodiment, the edge vehicle access program 150 may reevaluate one or more networks, after initial evaluation including a network currently in use, or a network previously determined unfit for use. Reevaluating may be performed regularly or continuously to ensure optimal performance or security, upon noticing a security vulnerability, in response to identifying new devices or networks, or in response to any other event.

Then, at 208, the edge vehicle access program 150 establishes access from the requesting device to the target device over the best available network. Establishing access may involve planning a connection between the requesting device and the target device, planning security techniques for the connection, determining to use the selected network, or determining a level of access.

Establishing access may involve using known security techniques, such as encryption, authentication, tokenization, or consensus protocols. Known security techniques may involve such technologies as secure socket layer (SSL) or secure file transfer protocol (SFTP). Security technologies may be used to connect any two devices, including connecting the requesting device to an access server, connecting the access server to the target device, or connecting a requesting device to a target device.

The best network available may be determined based on an evaluation of speed, reliability, or security at 206, or an overall evaluation of network quality at 206. For example, the best available network may be the network that requires the fewest devices or connections in order to establish a connection, or to establish a secure connection.

In at least one embodiment, determining a level of access may include determining what features or information to make available to the requesting device. For example, a low level of access may have permission to view the temperature of a home thermostat, whereas a high level of access may have permission to view and modify the temperature of a home thermostat.

In at least one embodiment, the edge vehicle access program 150 may reestablish access after access is first established. Reestablishing may be performed in response to reevaluating, upon losing a connection, regularly or continuously to ensure optimal performance or security, or in response to any other event.

In a further embodiment, access may be used to monitor or control the target device. For example, if the target device is a vehicle, access may be used to start the vehicle, lock or unlock the vehicle, turn on the vehicle's air conditioning unit, change the volume on the vehicle's speaker system, monitor the vehicle's battery level or gas level, monitor the vehicle's tire gauges, monitor the vehicle's maintenance history, or locate the vehicle. Alternatively, access may be used to drive the vehicle remotely.

Figure 3:
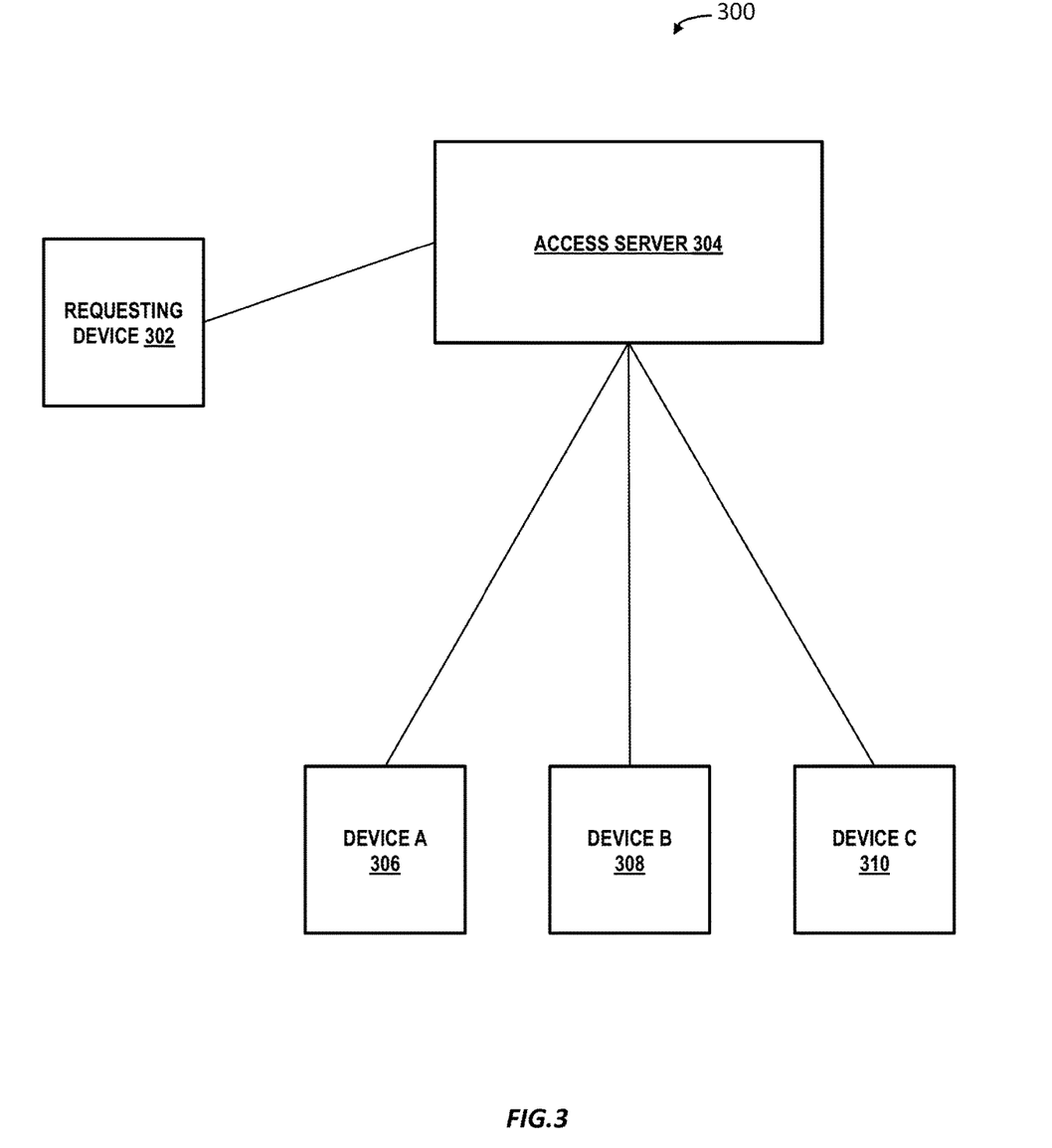
FIG. 3 illustrates an exemplary connection between a client device, cloud server, and several vehicles according to at least one embodiment.

Referring now to FIG. 3, an exemplary networked environment 300 is provided according to at least one embodiment. Networked environment 300 may be a direct network, where the target device is connected directly to access server 304. Device A 306, device B 308 and device C 310 may each be a target device or additional device. Each device may have a direct connection to access server 304. Each device may additionally have a direct connection to any other device, including the requesting device 302.

Figure 4:
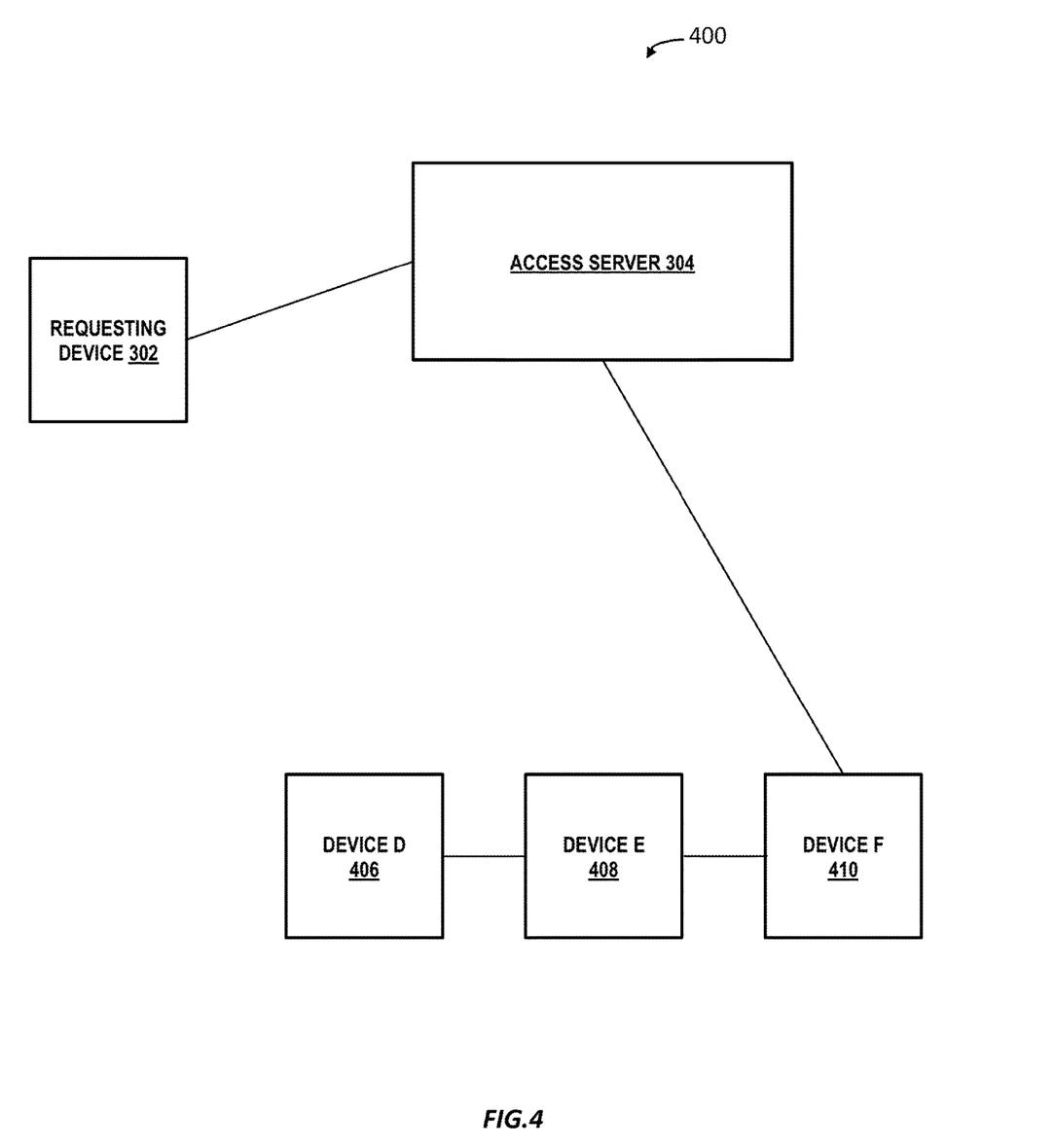
FIG. 4 illustrates another exemplary connection between a client device, cloud server, and several vehicles according to at least one embodiment.

Referring now to FIG. 4, an alternative exemplary secondary network environment 400 is provided according to at least one embodiment. Network environment 400 may be a secondary network, where the target device is connected indirectly to access server 304. Device D 406, device E 408 and device F 410 may each be a target device or additional device. Each additional device may have a direct connection to access server 304. Each device may additionally have a direct connection to any other device, including the requesting device 302. The target device may be connected indirectly to access server 304 through a connection with additional devices.

Figure 5:
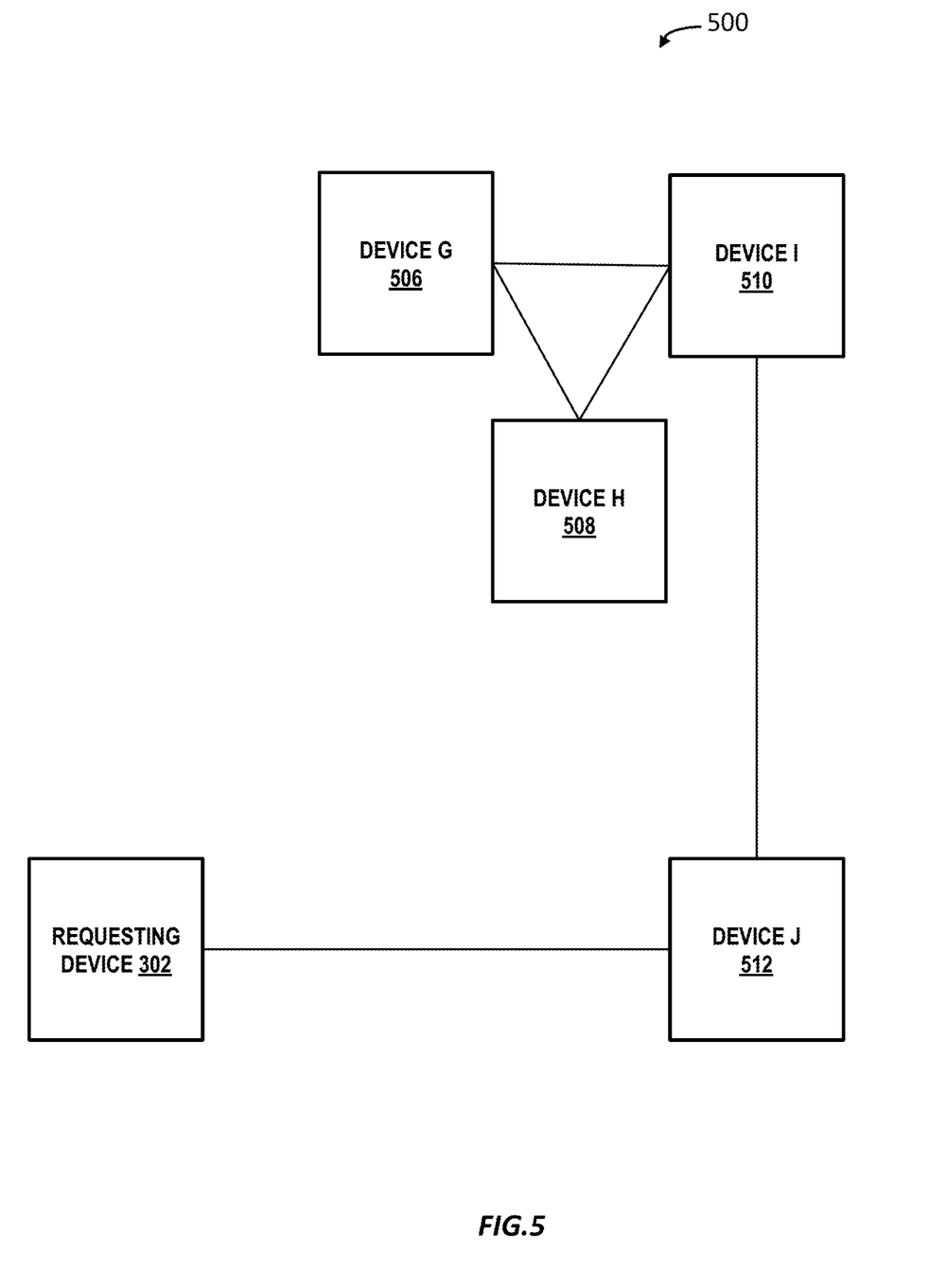
FIG. 5 illustrates an exemplary connection between a client device and several vehicles according to at least one embodiment.

Referring now to FIG. 5, an exemplary peer-to-peer network environment 500 is provided according to at least one embodiment. Network environment 500 may be a peer-to-peer network environment that does not contain an access server. Device G 506, device H 508 device I 510, and device J 512 may each be a target device or additional device. Each additional device may have a direct connection to any other device, including the requesting device 302. The target device may be connected directly or indirectly to the requesting device 302.

It may be appreciated that FIGS. 2, 3, 4, and 5 each provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    identifying at least two devices, including a requesting device and a target device, wherein the target device is a vehicle;
    identifying one or more networks, including one or more alternative networks, wherein at least one alternative network from the one or more alternative networks is a peer-to-peer network that contains two or more vehicles and does not contain an access server;
    evaluating each network from the one or more networks to determine a highest-ranked network according to one or more network criteria, wherein the one or more network criteria include a security factor, a speed factor, a signal strength factor, and a number of connections between the requesting device and the target device, and wherein evaluation of the speed factor comprises measuring a processor speed, an amount of memory, and a connection speed of each device of each network from the one or more networks; and
    establishing access from the requesting device to the target device over the determined highest-ranked network.

2. The method of claim 1, wherein the alternative network from the one or more alternative networks includes an access server and there is no direct connection between the target device and the access server.

3. The method of claim 1, wherein the requesting device is a mobile phone.

4. The method of claim 1, wherein the evaluating is performed by determining the number of connections necessary to establish secure access.

5. The method of claim 1, wherein a network that contains a direct connection between a target device and an access server is ranked higher than a network that does not contain a direct connection between a target device and an access server and a network that does contain an access server is ranked higher than a device that does not contain an access server.

6. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    identifying at least two devices, including a requesting device and a target device, wherein the target device is a vehicle;
    identifying one or more networks, including one or more alternative networks, wherein at least one alternative network from the one or more alternative networks is a peer-to-peer network that contains two or more vehicles and does not contain an access server;
    evaluating each network from the one or more networks to determine a highest-ranked network according to one or more network criteria, wherein the one or more network criteria include a security factor, a speed factor, a signal strength factor, and a number of connections between the requesting device and the target device, and wherein evaluation of the speed factor comprises measuring a processor speed, an amount of memory, and a connection speed of each device of each network from the one or more networks; and establishing access from the requesting device to the target device over the determined highest-ranked network.

7. The computer system of claim 6, wherein the alternative network from the one or more alternative networks includes an access server and there is no direct connection between the target device and the access server.

8. The computer system of claim 6, wherein the evaluating is performed by determining the number of connections necessary to establish access.

9. The computer system of claim 6, wherein the evaluating is performed by determining the number of connections necessary to establish secure access.

10. The computer system of claim 6, wherein a network that contains a direct connection between a target device and an access server is evaluated better than a network that does not contain a direct connection between a target device and an access server and a network that does contain an access server is considered better than a device that does not contain an access server.

11. A computer program product, the computer program product comprising:
one or more computer-readable tangible storage medium and program instructions stored on at least one of the one or more tangible storage medium, the program instructions executable by a processor capable of performing a method, the method comprising:
identifying at least two devices, including a requesting device and a target device, wherein the target device is a vehicle;
identifying one or more networks, including one or more alternative networks, wherein at least one alternative network from the one or more alternative networks is a peer-to-peer network that contains two or more vehicles and does not contain an access server;
evaluating each network from the one or more networks to determine a highest-ranked network according to one or more network criteria, wherein the one or more network criteria include a security factor, a speed factor, a signal strength factor, and a number of connections between the requesting device and the target device, and wherein evaluation of the speed factor comprises measuring a processor speed, an amount of memory, and a connection speed of each device of each network from the one or more networks; and
establishing access from the requesting device to the target device over the determined highest-ranked network.

12. The computer program product of claim 11, wherein the alternative network from the one or more alternative networks includes an access server and there is no direct connection between the target device and the access server.

13. The computer program product of claim 11, wherein the evaluating is performed by determining the number of connections necessary to establish access.

14. The computer program product of claim 11, wherein the evaluating is performed by determining the number of connections necessary to establish secure access.

* * * * *